US010125907B2

(12) United States Patent
French et al.

(10) Patent No.: US 10,125,907 B2
(45) Date of Patent: Nov. 13, 2018

(54) DOUBLE HINGE FLEX JOINT

(71) Applicant: EATON CORPORATION, Cleveland, OH (US)

(72) Inventors: Hugh N. French, Canandaigua, NY (US); Jeffrey E. Swensen, Eldersburg, MD (US)

(73) Assignee: Eaton Intelligent Power Limited, Dublin (IE)

( * ) Notice: Subject to any disclaimer, the term of this patent is extended or adjusted under 35 U.S.C. 154(b) by 251 days.

(21) Appl. No.: 15/022,043

(22) PCT Filed: Sep. 16, 2014

(86) PCT No.: PCT/US2014/055814
§ 371 (c)(1),
(2) Date: Mar. 15, 2016

(87) PCT Pub. No.: WO2015/039081
PCT Pub. Date: Mar. 19, 2015

(65) Prior Publication Data
US 2016/0230912 A1   Aug. 11, 2016

Related U.S. Application Data

(60) Provisional application No. 61/878,352, filed on Sep. 16, 2013.

(51) Int. Cl.
*F16L 27/073* (2006.01)
*F16L 25/12* (2006.01)
(Continued)

(52) U.S. Cl.
CPC ............. *F16L 27/073* (2013.01); *F16L 25/12* (2013.01); *F16L 27/04* (2013.01); *B64D 2013/0625* (2013.01)

(58) Field of Classification Search
CPC ....... F16L 27/04; F16L 27/073; F16L 27/053; F16L 27/06
(Continued)

(56) References Cited
U.S. PATENT DOCUMENTS 209,591 A * 11/1878 Stoddard ................. F16L 27/04
285/146.1
840,325 A *  1/1907 Hawley ................... F16L 27/04
285/265
(Continued)

FOREIGN PATENT DOCUMENTS

DE    1168262 B    4/1964
DE    8311593 U1   12/1983
(Continued)

OTHER PUBLICATIONS

Chinese Office Action with Summary, 201480050853.4, dated Apr. 1, 2017.
(Continued)

Primary Examiner — David Bochna
(74) Attorney, Agent, or Firm — Fishman Stewart PLLC

(57) ABSTRACT

A fluid conduit joint includes a tube seal having a first bubble portion and a second bubble portion; a first tube adapter (40*a*); a second, tube adapter (40*b*); and a cover (50). The tube seal further includes a first hinge (60) and a second hinge (60). The first hinge (60) connects the first tube adapter (40*a*) to the cover (50), the first hinge (60) generally corresponding to the first bubble portion; the second hinge (60) connects the second tube adapter (40*b*) to the cover (50), the second hinge (60) generally corresponding to the second bubble portion; and the first hinge (60) and the second hinge (60) are axially spaced from each other.

20 Claims, 11 Drawing Sheets

(51) Int. Cl.
*F16L 27/04* (2006.01)
*B64D 13/06* (2006.01)

(58) Field of Classification Search
USPC ............. 285/146.1, 146.2, 146.3, 147.1, 223
See application file for complete search history.

(56) References Cited

U.S. PATENT DOCUMENTS

| | | | | |
|---|---|---|---|---|
| 1,015,435 A | * | 1/1912 | Greenlaw et al. | F16L 27/06 285/146.2 |
| 1,220,270 A | * | 3/1917 | Phillips | F16L 27/04 285/263 |
| 1,222,682 A | * | 4/1917 | Schreiber | F16L 27/04 285/146.1 |
| 1,351,875 A | * | 9/1920 | Schreiber | F16L 27/04 285/146.1 |
| 1,639,771 A | * | 8/1927 | Gold | F16L 27/044 285/147.1 |
| 1,782,484 A | * | 11/1930 | Spencer | F16L 27/06 285/146.3 |
| 2,417,250 A | | 3/1947 | Harvey | |
| 2,976,064 A | * | 3/1961 | Croy | F16L 27/04 285/145.3 |
| 3,064,419 A | * | 11/1962 | Ward | B64C 9/38 285/146.1 |
| 3,396,992 A | * | 8/1968 | Hale | F16L 27/04 285/267 |
| 3,915,482 A | | 10/1975 | Fletcher et al. | |
| 3,995,896 A | | 12/1976 | Decker | |
| 4,035,004 A | * | 7/1977 | Hengesbach | F16L 27/04 285/146.1 |
| 4,408,785 A | | 10/1983 | Legros et al. | |
| 4,643,463 A | | 2/1987 | Halling et al. | |
| 5,106,129 A | | 4/1992 | Camacho et al. | |
| 5,280,968 A | | 1/1994 | Moore et al. | |
| 5,340,165 A | | 8/1994 | Sheppard | |
| 5,772,254 A | * | 6/1998 | Felber | F16L 27/06 285/233 |
| 6,109,662 A | * | 8/2000 | van Zuthem | F16L 27/04 285/146.2 |
| 6,846,022 B2 | | 1/2005 | Takagi | |
| 7,207,601 B2 | | 4/2007 | Baharav | |
| 7,556,295 B2 | | 7/2009 | Holzheu | |
| 8,220,843 B2 | | 7/2012 | More et al. | |
| 2003/0077110 A1 | * | 4/2003 | Knowles | F16L 27/04 403/56 |
| 2003/0132630 A1 | * | 7/2003 | French | F16L 27/06 285/223 |
| 2004/0032123 A1 | | 2/2004 | Chu | |
| 2010/0045031 A1 | | 2/2010 | Peachey | |
| 2013/0300106 A1 | * | 11/2013 | French | F16L 27/0857 285/223 |

FOREIGN PATENT DOCUMENTS

| | | | | |
|---|---|---|---|---|
| FR | 1306749 A | * | 10/1962 | ............ F16L 27/053 |
| GB | 527690 A | | 10/1940 | |
| GB | 2138904 A | * | 10/1984 | ............ F16L 27/073 |
| GB | 2170567 A | | 2/1985 | |
| WO | 2006125667 A1 | | 11/2006 | |

OTHER PUBLICATIONS

European Patent Office; International Search Report and Written Opinion issued in corresponding International Application No. PCT/US2014/055814. dated Dec. 11, 2014.
Senior Aerospace Bird Bellows Brochure. Copyright 2006.

* cited by examiner

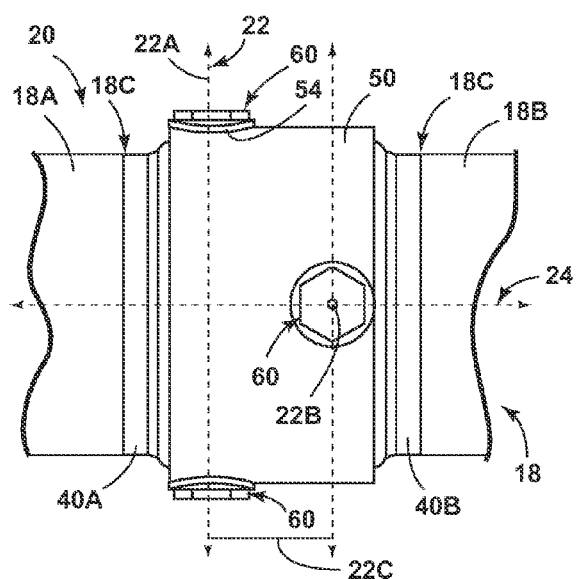
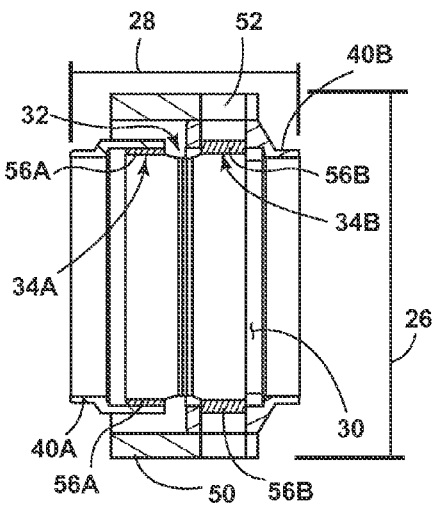
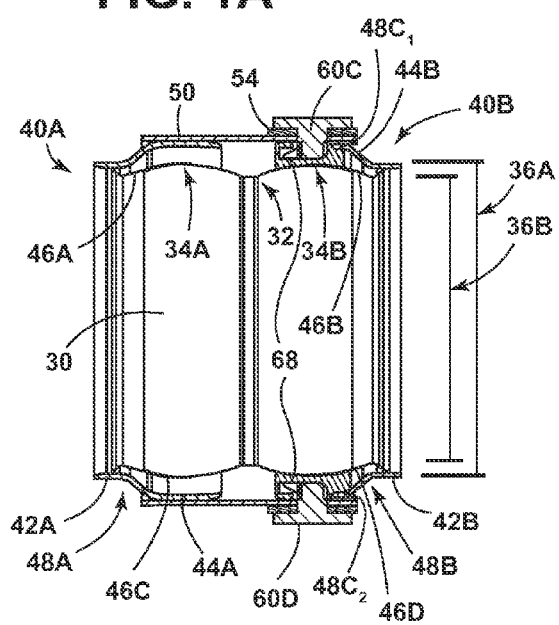
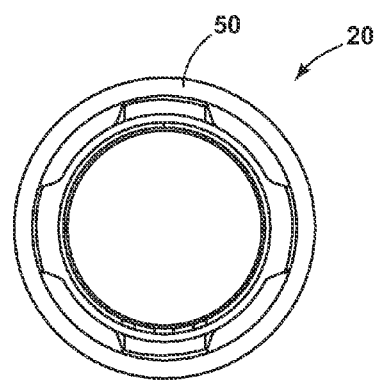
FIG. 1A
FIG. 2A
FIG. 1B
FIG. 2B

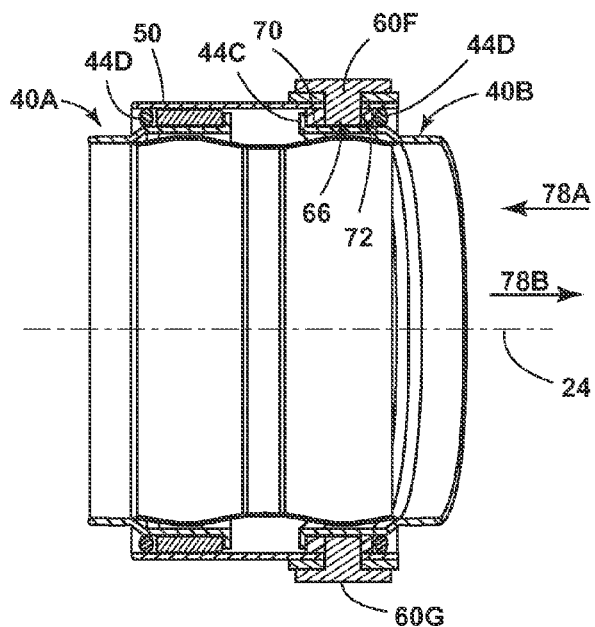
FIG. 6A
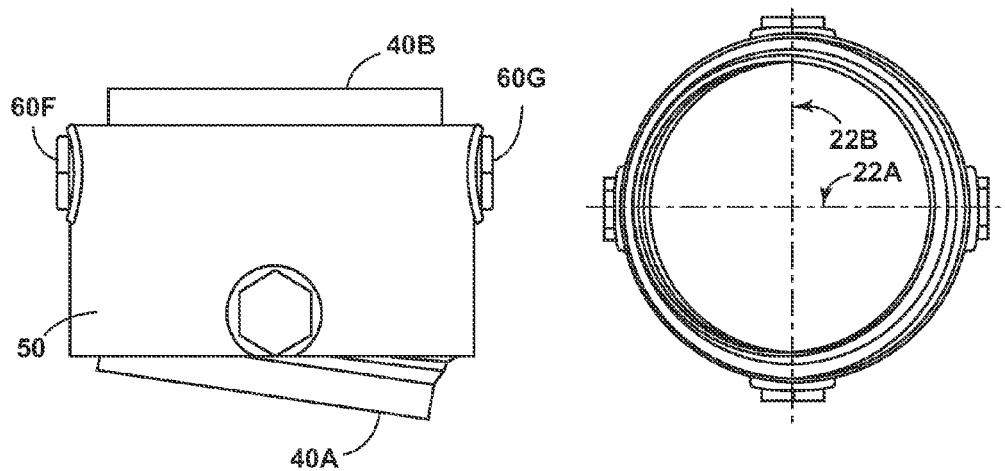
FIG. 6B
FIG. 6C

US 10,125,907 B2

DOUBLE HINGE FLEX JOINT

CROSS-REFERENCE TO RELATED APPLICATION

This application is a national stage filing based upon International PCT Application No. PCT/US2014/055814, with an international filing date of Sep. 16, 2014, which claims the benefit of U.S. Provisional Patent Application No. 61/878,352, filed Sep. 16, 2013, both of which are hereby incorporated by reference as though fully set forth herein.

TECHNICAL FIELD

The present disclosure relates to joints, including joints configured to connect fluid ducts.

BACKGROUND

Joints are often used to connect two or more portions of fluid ducts. Universal joints may permit two portions to be joined together with one or more degrees of freedom.

SUMMARY

An embodiment of the present disclosure includes a joint including a tube seal including first and second bubble portions, first and second tube adapters, a cover, a first set of hinges connecting the first tube adapter to the cover, the first set of hinges generally corresponding to the first bubble portion, and a second set of hinges connecting the second tube adapter to the cover, the second set of hinges generally corresponding to the second bubble portion.

An embodiment of the present disclosure includes an aircraft air duct double hinge joint, including a double bubble tube seal, a cover, first and second tube adapters, a first set of hinges axially spaced from a second set of hinges, the first set of hinges connecting the first tube adapter to the cover, the second set of hinges connecting the second tube adapter to the cover.

BRIEF DESCRIPTION OF THE DRAWINGS

FIG. 1A is a side view generally illustrating portions of a joint in accordance with teachings of an embodiment of the present disclosure.

FIG. 1B is a cross-sectional view generally illustrating portions of a joint in accordance with teachings of an embodiment of the present disclosure.

FIG. 2A is a cross-sectional view generally illustrating portions of a joint in accordance with teachings of an embodiment of the present disclosure.

FIG. 2B is a side view generally illustrating portions of a joint in accordance with teachings of an embodiment of the present disclosure.

FIG. 6A is a cross-sectional view generally illustrating portions of a joint in accordance with teachings of an embodiment of the present disclosure.

FIGS. 6B and 6C are side views generally illustrating portions of a joint in accordance with teachings of embodiments of the present disclosure.

DETAILED DESCRIPTION

Figure 1C:
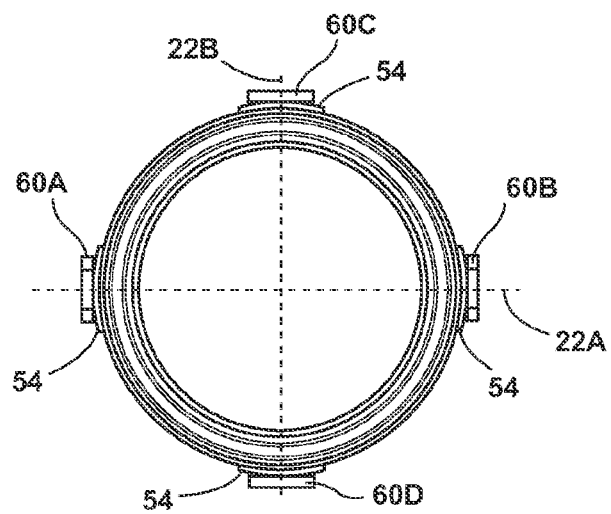
FIG. 1C is a side view generally illustrating portions of a joint in accordance with teachings of an embodiment of the present disclosure.
Figure 1D:
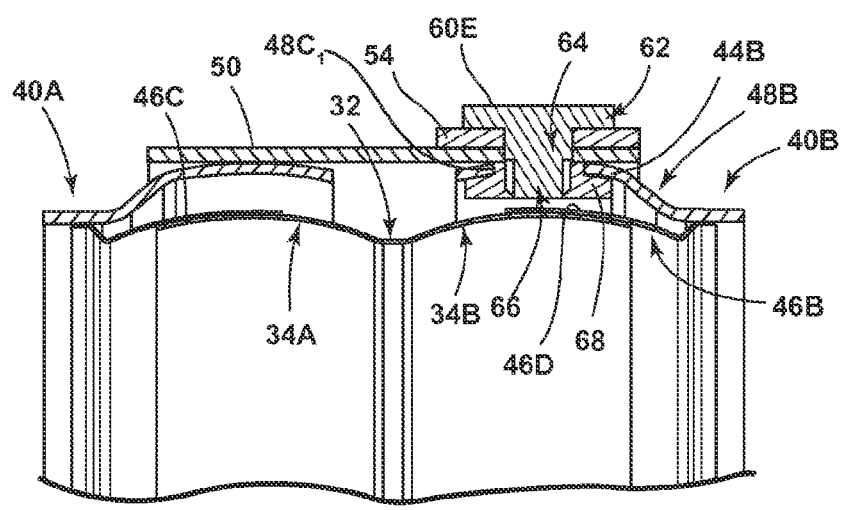
FIG. 1D is a cross-sectional view generally illustrating portions of a joint in accordance with teachings of an embodiment of the present disclosure.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by appended claims.

As generally illustrated in FIGS. 1A-4, embodiments of a joint 20 may include a seal 30, one or more adapters (e.g., 40A, 40B), a cover 50, and/or one or more pins 60. Joint 20 may be configured to connect a first section 18A of fluid conduit 18 and a second section 18B of fluid conduit 18. Fluid conduit 18 may be configured as a fluid duct and/or a high temperature aircraft air duct, and may be referred to herein as duct 18. Duct 18 may be configured to convey fluid, such as, for example, bleed air from an aircraft engine. Duct 18 may comprise one or more of a variety of materials, such as, without limitation, titanium.

In embodiments, joint 20 may be configured with one or more angulation centers 22. Angulation centers 22 may be referred to herein in the singular as a hinge axis, and in the plural as hinge axes 22. Hinge axes 22 may permit first and/or second sections 18A, 18B of duct 18 to pivot in at least one direction. In embodiments, joint 20 may include two hinge axes 22A, 22B that may be arranged generally perpendicular to the longitudinal axis 24 of joint 20. With reference to FIG. 1A, it is noted that hinge axis 22B would actually be running perpendicular to the page. The hinge axes 22A, 22B may be axially spaced/separated from each other by axial separation 22C, which may correspond to joint 20 comprising a double hinge joint. Axial separation 22C may allow joint 20 to have a reduced overall diameter 26 and/or length 28 relative to conventional joints in which hinges axes are typically all coplanar (e.g., not axially separated) and overlap in the radial direction and/or the circumferential direction. Joint 20 may also include a reduced weight relative to convention joints, which may correspond to a reduced overall diameter and/or length. Such axial separation may also permit hinge axes (e.g., 22A, 22B) to be aligned parallel to each other and/or at any angle in between.

In embodiments, joint 20 may include a seal 30. Seal 30 may be configured as a tube seal and seal 30 may be referred to herein as tube seal 30. Tube seal 30 may be generally cylindrical and may include a neck portion 32 and/or one or more extending portions. The extending portions, which may be referred to herein as bubble portions (e.g., first bubble portion 34A and second bubble portion 34B), may be disposed at or about opposite axial ends of neck portion 32. Bubble portions 34A, 34B may be located at or near distal ends of tube seal 30 and may correspond to portions of tube seal 30 that include larger and/or smaller diameters than neck portion 32. For example, bubble portions 34A, 34B may correspond to portions of tube seal 30 in which the diameter of tube seal 30 gradually increases to a maximum diameter 36A and then decreases to a minimum diameter 36B, which may result in a generally curved and/or bubbled configuration. In embodiments, bubble portions 34A, 34B may include maximum diameters greater than a maximum diameter of neck portion 32 and/or may include minimum diameters less than the minimum diameter of neck portion 32. Tube seal 30 may act as a primary enabler and the bubble portions 34A, 34B may correspond to (e.g., the centers of bubble portions 34A, 34B may be generally aligned with) hinge axes 22A, 22B. Tube seal 30 may be configured to allow fluid to be transported through it. In embodiments, tube seal 30 may include one or more materials, such as, for example only, an iron-based metal.

In embodiments, joint 20 may include a first adapter 40A and a second adapter 40B that may be configured as tube adapters and/or fluid conduit adapters. In embodiments, first and second adapters 40A, 40B may be configured for connection to end portions 18C of first and/or second sections 18A, 18B of fluid conduit 18. Tube adapters 40A, 40B may include a variety of sizes, shapes, and/or configurations. First and second tube adapters 40A, 40B may be substantially similar to each other or may be different from each other. For example, and without limitation tube adapters 40A, 40B may include generally the same shape and/or maximum diameter.

In embodiments, tube adapters 40A, 40B may be configured for connection with and/or may be connected to end portions 18C in a variety of ways, including, but not limited to, welding. In embodiments, it may be desirable for tube adapters 40A, 40B to comprise one or more materials that may be compatible with the material of duct 18. For example, and without limitation, duct 18 and tube adapters 40A, 40B may comprise titanium. Tube adapters 40A, 40B may include a generally cylindrical shape and may include first portions 42A, 42B and/or second portions 44A, 44B. Tube adapter first portions 42A, 42B may include diameters that are larger than the diameter of duct 18 and tube adapter first portions 42A, 42B may be configured to be arranged at least partially around duct 18. Additionally or alternatively, first portions 42A, 42B may include diameters that are smaller than the diameter of duct 18 and tube adapter first portions 42A, 42B may be configured to be arranged at least partially within duct 18. In embodiments, first portions 42A, 42B may include diameters that are substantially the same as the diameter of duct 18. In embodiments, tube adapters 40A, 40B may comprise one or more materials and/or may generally comprise the same or similar material as duct 18.

As generally illustrated in FIGS. 1A-1D, tube adapters 40A, 40B may include second portions 44A, 44B. Second portions 44A, 44B may be disposed axially inward of first portions 42A, 42B. Tube adapter second portions 44A, 44B may include diameters that are larger than the minimum and/or maximum diameters 36A, 36B of tube seal 30. Tube adapter second portions 44A, 44B may be configured to be arranged at least partially around tube seal 30. Tube adapter second portions 44A, 44B may be configured to be arranged at least partially around at least one of first and second bubble portions 34A, 34B of tube seal 30. In embodiments, second portions 44A, 44B may correspond to (e.g., be generally aligned with) first and second bubble portions 34A, 34B. For example, and without limitation, second portions 44A, 44B may extend axially at least to the center of first and second bubble portions 34A, 34B, which may include extending axially beyond the centers of first and second bubble portions 34A, 34B (e.g., toward neck 32). In embodiments, tube adapter second portions 44A, 44B may include diameters that are smaller than a diameter of cover 50. In embodiments, as generally illustrated in FIG. 1B, second portions 44A, 44B may be configured to contact the tube seal 30. Tube adapters 40A, 40B may be configured to slide relative to tube seal 30, which may accommodate pivotal movement of tube adapters 40A, 40B about hinge axes 22A, 22B. In embodiments, tube adapters 40A, 40B may be axially separated from each other, which may include not overlapping in the radial direction and/or the circumferential direction (e.g., relative to longitudinal axis 24 of joint 20).

As generally illustrated in FIGS. 1A-1D and 3, tube adapters (e.g., first and second tube adapters 40A, 40B) may include inner portions 46A, 46B. Inner portions 46A, 46B may be configured to contact tube seal 30. Inner portions 46A, 46B and tube seal 30 may be configured to move relative to each other. Movement of inner portions 46A, 46B and tube seal 30 relative to each other may include a sliding movement. For example, and without limitation, inner portions 46A, 46B may include curved portions (e.g., curved portions 46C, 46D) that may correspond to bubble portions of tube seal 30 (e.g., bubble portion 34A and/or 34B). Contact between inner portions 46A, 46B and tube seal 30 may include a fluid sealing arrangement. In embodiments, inner portions 46A, 46B may be connected to tube seal independently of welding inner portions 46A, 46B and/or any portion of tube adapters 40A, 40B to tube seal 30. In embodiments, tube adapters 40A, 40B may include outer portions 48A, 48B, respectively, that may be disposed radially outward of inner portions 46A, 46B. Outer portions 48A, 48B may be configured for connection with cover 50, which may comprise including apertures (e.g., apertures $48C_1$, $48C_2$, $48C_3$, $48C_4$). Outer portion apertures $48C_1$, $48C_2$, $48C_3$, $48C_4$ may be configured to receive at least a portion of a pin 60 and/or at least a portion of a retainer 68 (e.g., a generally illustrated in FIGS. 1B and 1D).

In embodiments, such as generally illustrated in FIGS. 2A-2D, joint 20 may include one or more bearing sleeves (e.g., bearing sleeves 56A, 56B) that may be disposed between tube adapters 40A, 40B and tube seal 30. For example, and without limitation, bearing sleeve 56A may be disposed between second portion 44A of tube adapter 40A and first bubble portion 34A of tube seal 30, and/or bearing sleeve 56B may be disposed between second portion 44B of tube adapter 40B and second bubble portion 34B of tube seal 30. Bearing sleeves 56A, 56B may be configured as a wear element and/or may reduce wear that may be caused by contact between tube adapters 40A, 40B and tube seal 30. For example, and without limitation, bearing sleeves 56A, 56B may include carbon, a cobalt alloy, and/or other materials. Bearing sleeves 56A, 56B may include a generally cylindrical shape and/or may extend partially and/or entirely about the circumference of tube seal 30. Bearing sleeves 56A, 56B may or may not be configured substantially the same as each other, which may comprise including generally the same shape (e.g., may be interchangeable) and/or maximum diameter. In embodiments, bearing sleeves 56A, 56B may be press fit into tube adapters 40A, 40B, respectively. Joint 20 may include one or more retaining elements (e.g., retaining elements 58A, 58B) that may be configured to hold and/or help hold bearing sleeves 56A, 56B in place relative to tube adapters 40A, 40B. Retaining elements 58A, 58B may include a generally ring-like shape.

In embodiments, joint 20 may include a cover 50. Cover 50 may be configured as a cover and/or a gimbal ring, and may be referred to herein as cover 50 and/or gimbal ring 50. Cover 50 may be configured to connect first and second tube adapters 40A, 40B to each other. Cover 50 may include one or more sizes, shapes, and/or configurations, which may comprise including a generally cylindrical shape. Cover 50 may include a generally uniform diameter that may be larger than the maximum diameter of second portions 44A, 44B of tube adapters 40A, 40B and may be disposed around all of tube seal 30 (e.g., may include a greater diameter than tube seal 30 and a greater length than tube seal 30). Cover 50 may be configured to be disposed at least partially around the second portions 44A, 44B of tube adapters 40A, 40B. As generally illustrated in FIGS. 2A, 2D, 3, and 4, cover 50 may include one or more apertures 52 and apertures 52 may correspond to one or more pins 60. In embodiments, cover 50 may include a recess 50A that may extend circumferentially all or part of the way around cover 50. Recess 50A may reduce the weight of joint 20 by reducing the amount of material used for cover 50. In embodiments, cover 50 may comprise one or more materials, such as, for example only, aluminum and/or titanium.

Figure 2C:
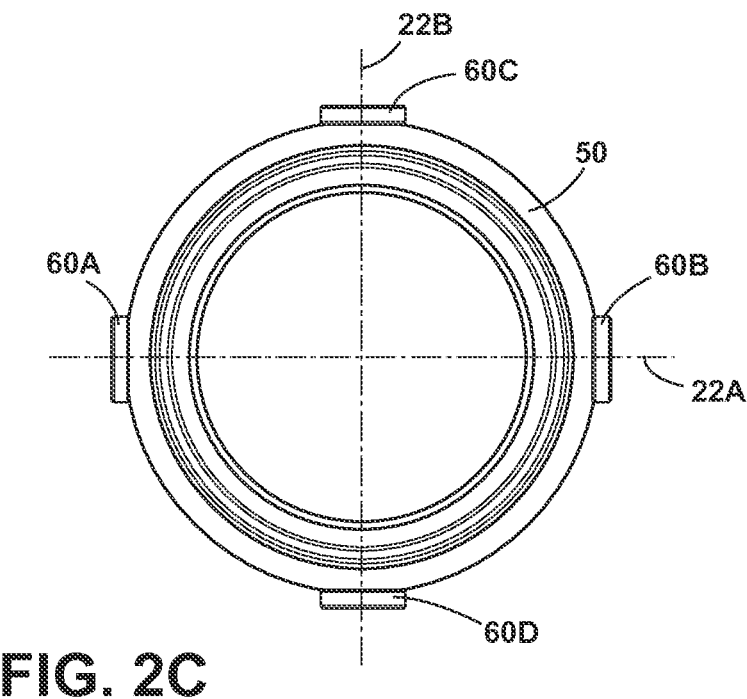
FIG. 2C is a side view generally illustrating portions of a joint in accordance with teachings of an embodiment of the present disclosure.
Figure 2D:
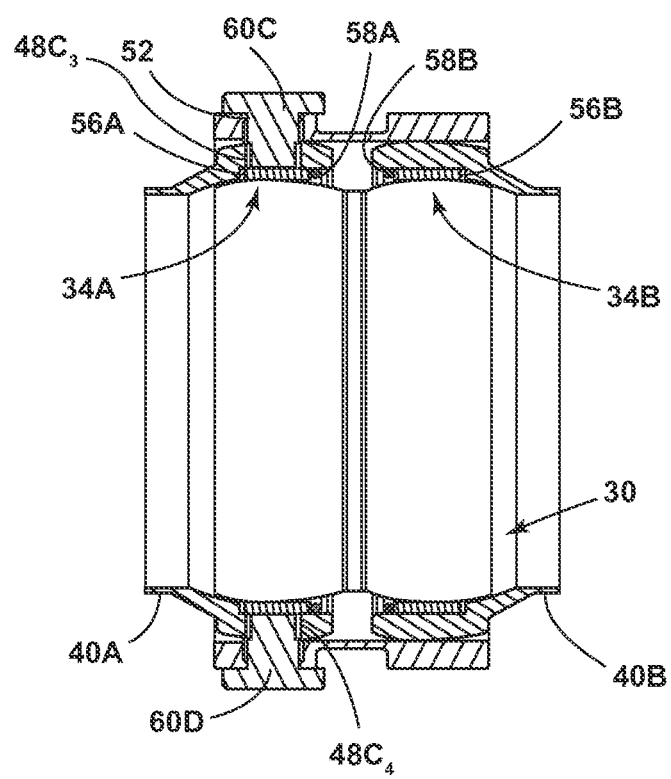
FIG. 2D is a partial cross-sectional view generally illustrating portions of a joint in accordance with teachings of an embodiment of the present disclosure.
Figure 2E:
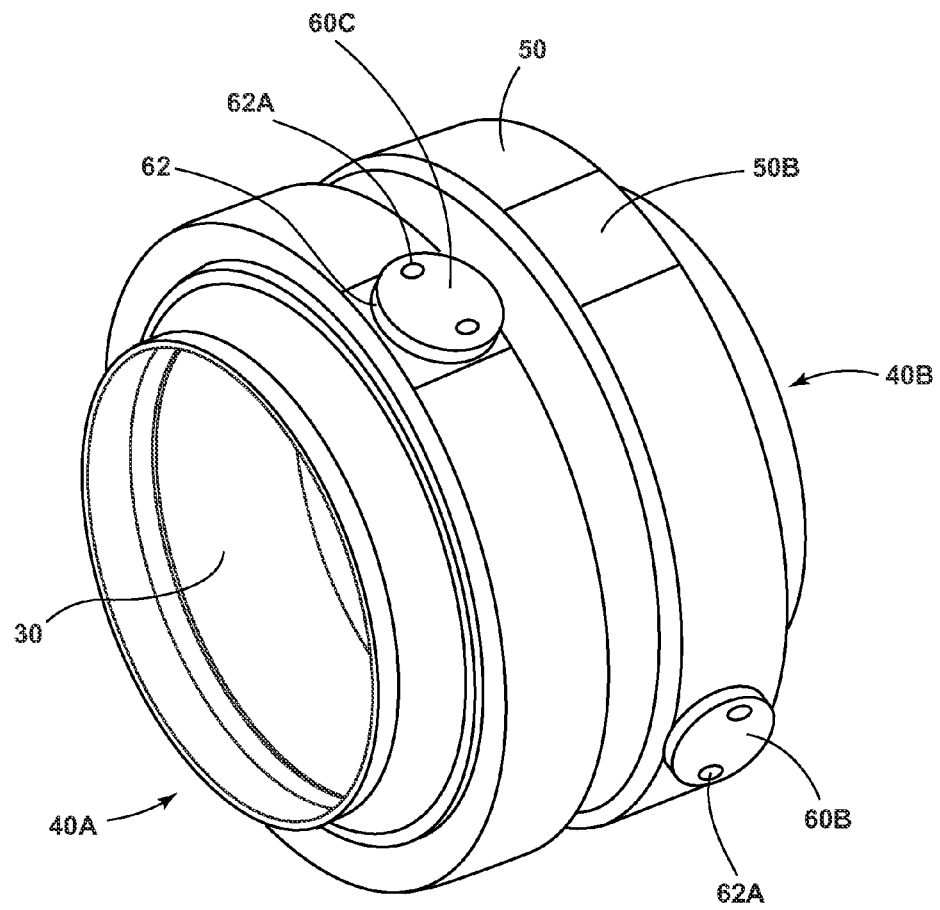
FIG. 2E is a perspective view generally illustrating portions of a joint in accordance with teachings of an embodiment of the present disclosure.
Figure 2F:
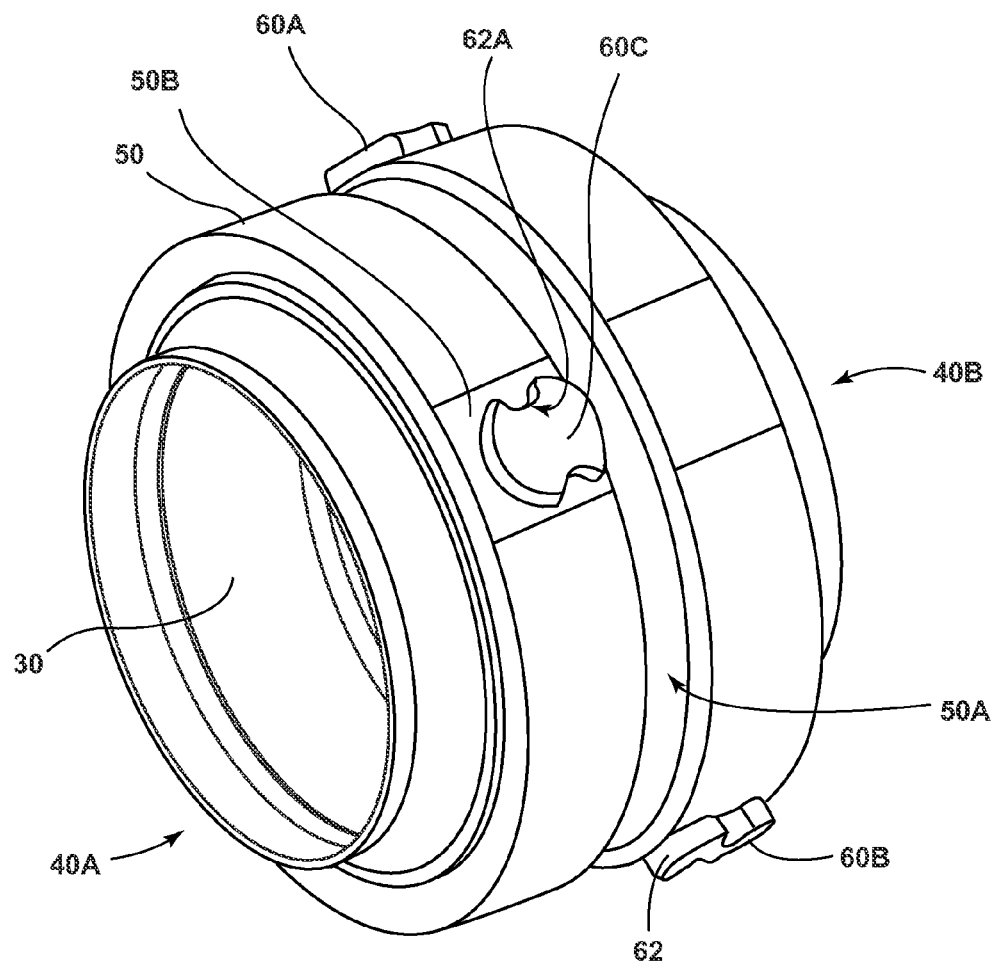
FIG. 2F is a perspective view generally illustrating portions of a joint in accordance with teachings of an embodiment of the present disclosure.
Figure 3:
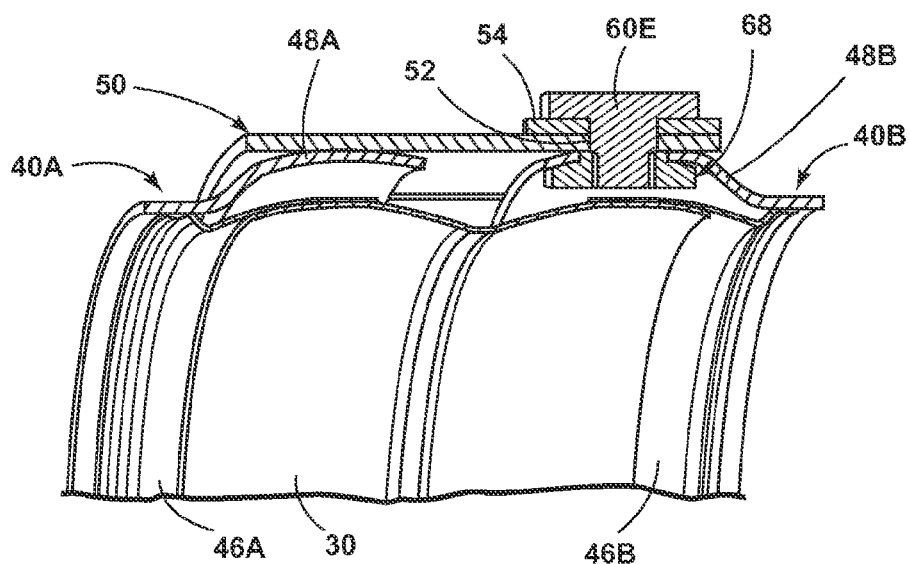
FIG. 3 is a partial cross-sectional view generally illustrating portions of a joint in accordance with teachings of an embodiment of the present disclosure.

In embodiments, joint 20 may include one or more pins 60. Pins 60 may include one or more of a variety of sizes, shapes, and/or configurations. In embodiments, pins 60 may include a head portion 62, a neck portion 64, and/or a connecting portion 66. Head portion 62 may include a diameter that is larger than the diameter of apertures 52, which may allow head portion 62 to limit the extent to which pins 60 can extend into and/or through apertures 52. As generally illustrated in FIGS. 2E and 2F, head portion 62 may include one or more attachment/securing features, such as apertures/recesses 62A. Apertures/recesses 62A may be configured for welding pin 60 to cover 50. In embodiments, an aperture/recess 62A may comprise a generally hemispherical recess that may reduce the diameter of head portion 62 in some areas (e.g., see FIG. 2F). In embodiments, cover 50 may include one or more flat areas 50B that may correspond to head portions 62 and/or may allow the underside of head portions 62 to be disposed generally flat against cover 50.

In embodiments, neck portion 64 may include a diameter that is smaller than the diameter of head portion 62 and/or smaller than the diameter of apertures 52, and/or at least as large or larger than connection portion 66. A length of neck portion 64 may correspond to a thickness of cover 50. Neck portion 64 may be threaded along all or part of its length, and/or may correspond to threads of apertures 52 of cover 50. Connecting portions 66 may be configured for connection with tube adapters 40A, 40B, which may be retainer 68. For example, and without limitation, connection portions 66 may be threaded to correspond to threads of retainer 68. In embodiments, as described in greater detail below in connection with FIGS. 6A-7, connecting portions 66 may be configured for connection and/or engagement with a retaining ring 70.

In embodiments, pins 60 may be disposed at one or more of a variety of positions, which may include positions along the outer circumference of cover 50. Joint 20 may include one or more pins 60. For example, and without limitation, joint 20 may include a first set of two pins (e.g., pins 60A, 60B) associated with first tube adapter 40A and a second set of two pins (e.g., pins 60C, 60D) associated with second tube adapter 40B. As generally illustrated in FIGS. 1A and 2C, pins 60 in each set may be arranged on opposite sides of joint 20 (e.g., separated by about 180 degrees).

In embodiments, pins 60 may be configured to connect first and second tube adapters 40A, 40B (e.g., second portions 44A, 44B and/or outer portions 48A, 48B) to cover 50. Pins 60 may connect first and second tube adapters 40A, 40B to cover 50 in such a way as to create a secondary seal, which may help keep fluid flowing through joint 20 from leaking out and/or help keep external foreign materials out of joint 20. First and second tube adapters 40A, 40B may be arranged relative to cover 50 in such a way that puts pins 60 in shear loading with reduced and/or minimal pin bending load.

Joint 20 may include one or more plates 54, which may include weld doubler plates, that may be arranged between one or more of pins 60 and cover 50. Plates 54 may facilitate connecting and/or securing pins 60 relative to cover 50. In embodiments including plates 54, the length of neck portion 64 may generally correspond to the combined thickness of cover 50 and the plates 54.

In embodiments, pins 60 may axially retain first and second tube adapters 40A, 40B relative to cover 50 and/or relative to each other. Pins 60 may be configured as one or more hinges and/or may define one or more hinge axes 22. For example, pins 60A and 60B may be configured as a first hinge and may define first hinge axis 22A. Pins 60A and 60B may permit first tube adapter 40A to pivot in at least a first plane, which may be perpendicular to hinge axis 22A. Pins 60C and 60D may be configured as a second hinge and may be define a second hinge axis 22B. Pins 60C and 60D may permit second tube adapter 40B to pivot in at least a second plane, which may be perpendicular to second hinge axis 22B. In embodiments, a plurality of pins may be connected together in a single body.

Pins 60 may be configured to restrict rotational and/or torsional movement of the tube adapters 40A, 40B relative to cover 50 and/or tube seal 30. For example, as generally illustrated in FIGS. 1B, 1D, 2A, 2D, 3, and 4 one or more of pins 60 may extend through cover 50 into and/or through tube adapters 40A, 40B (e.g., through one or more of apertures $48C_1$, $48C_2$, $48C_3$, $48C_4$). Pins (e.g., pin 60E) may extend through cover 50, through aperture $48C_1$, and into a retainer 68, which may include a nut configured to be connected to pin 60E (e.g., at or about connecting portion 66). Pins 60 may be connected to a retainer 68 in a variety of ways, which may include, for example, a threaded engagement. Retainer 68 may be at least partially disposed between the inner and outer portions of tube adapter (e.g., inner portion 46B and outer portion 48B).

Figure 4:
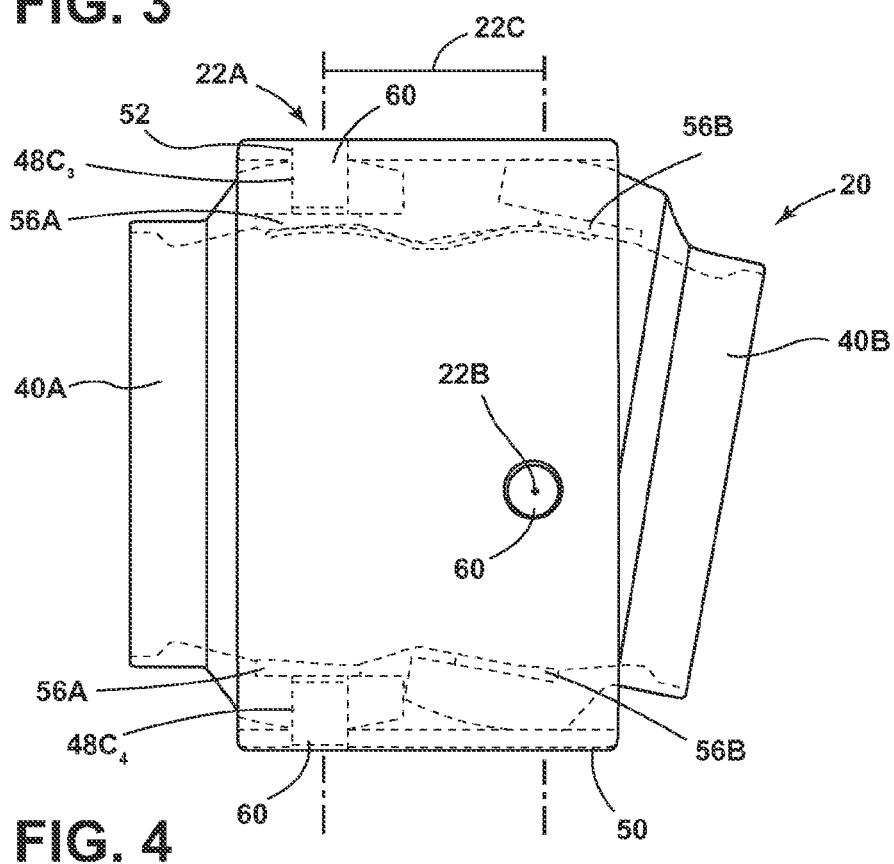
FIG. 4 is a side view generally illustrating portions of a joint in accordance with teachings of an embodiment of the present disclosure.
Figure 5A:
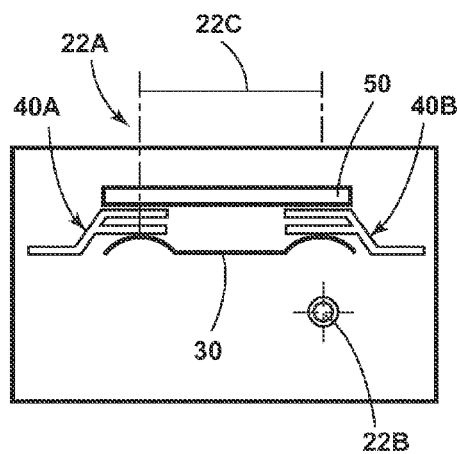
FIGS. 5A-5D generally illustrate hinge axis configurations of embodiments of joints in accordance with teachings of embodiments of the present disclosure.
Figure 5B:
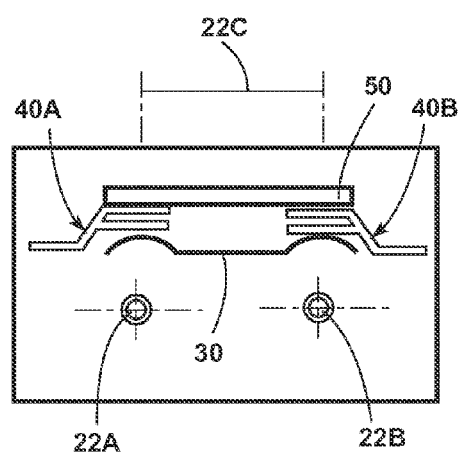
Figure 5C:
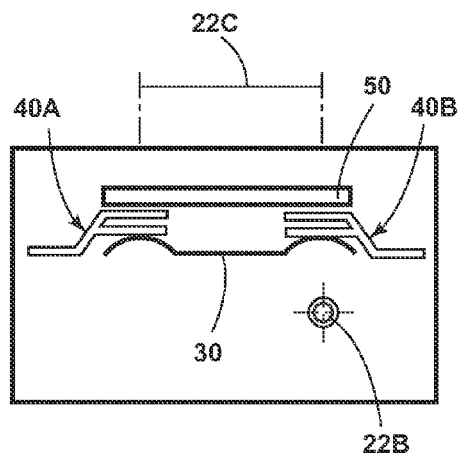
Figure 5D:
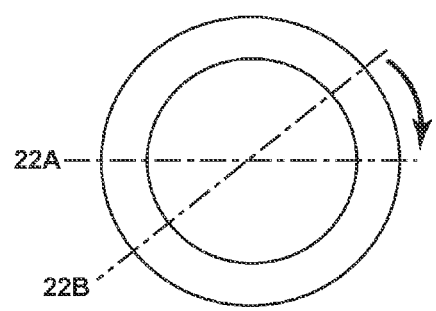

As generally illustrated in FIGS. 4-5D, axial separation 22C of hinges axes 22 may permit a variety of configurations of hinge axes 22. In a first configuration, as generally illustrated in FIGS. 4 and 5A, hinge axes 22 may be arranged generally perpendicular relative to each other. In a second configuration, as generally illustrated in FIG. 5B, hinge axes 22 may be parallel to each other. The second configuration may provide the greatest amount of flexibility in a particular plane, but may provide limited flexibility in some and/or all other planes. In a third configuration, as generally illustrated in FIGS. 5C and 5D, hinge axes 22 may be arranged in a skewed/oblique configuration (e.g., not parallel or perpendicular). The third configuration may be desirable for situations in which a greater degree of flexibility is desired in one plane (e.g., greater than the flexibility provided by the first configuration), and some flexibility is still desired in a second plane (e.g., which may not be available in the second configuration).

Figure 6D:
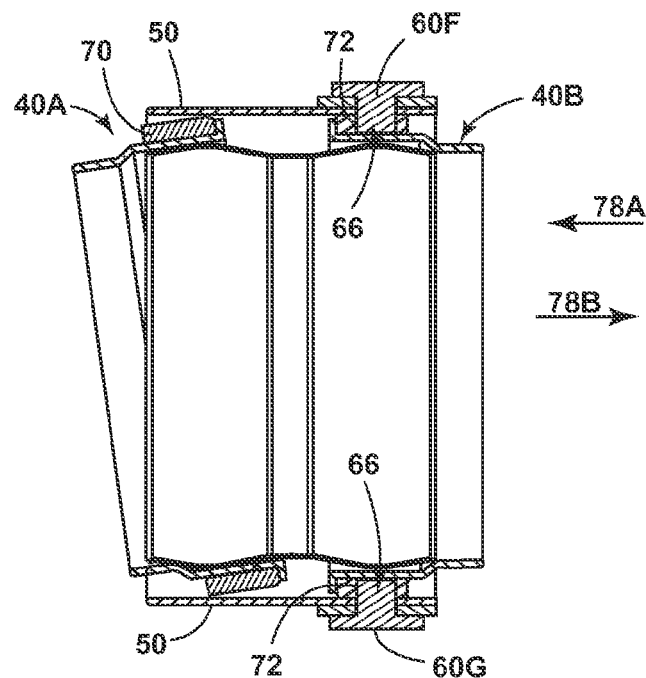
FIG. 6D is a cross-sectional view generally illustrating portions of a joint in accordance with teachings of embodiments of the present disclosure.
Figure 6E:
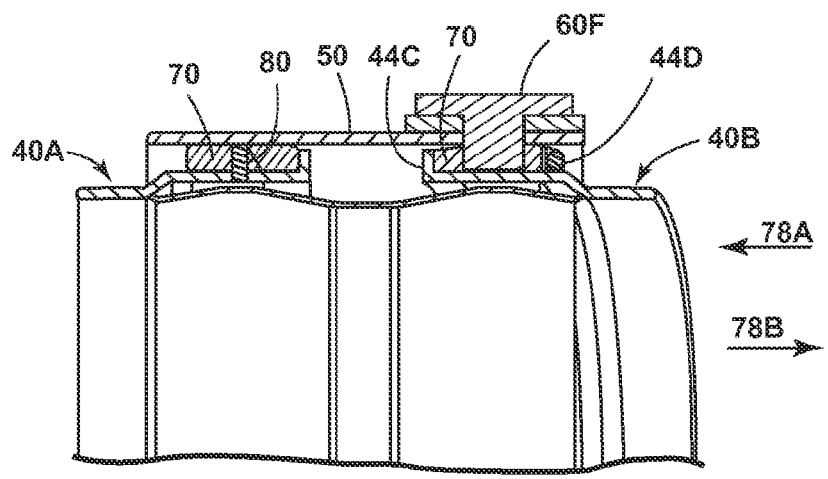
FIGS. 6E and 7 are partial cross-sectional views generally illustrating portions of joints in accordance with teachings of embodiments of the present disclosure.
Figure 7:
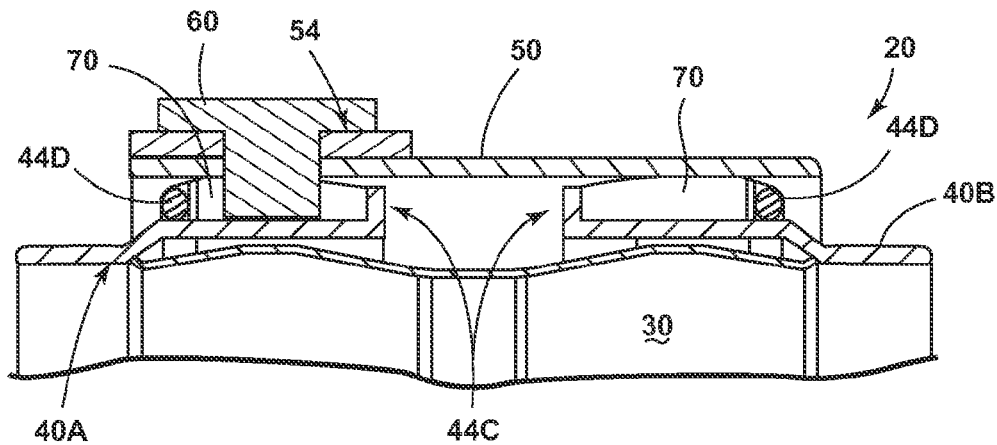

As generally illustrated in FIGS. 6A-7, in embodiments, pins 60 may extend though cover 50 into a retaining ring 70. Retaining ring 70 may be arranged between cover 50 and a tube adapter (e.g., tube adapter 40A and/or tube adapter 40B). Retaining ring 70 may be configured to restrict axial movement of cover 50 and a tube adapter (e.g., 40A and/or 40B) relative to each other in at least one direction (e.g., direction 78B) and/or may be configured to permit at least some rotational and/or torsional movement (e.g., about longitudinal axis 24) of cover 50 and a tube adapter relative to each other. For example, and without limitation, retaining ring 70 may be configured to slide relative to a tube adapter (e.g., tube adapter 40B). Torsional and/or rotational freedom may help compensate for manufacturing tolerances. In embodiments, tube adapter 40A and/or tube adapter 40B may be configured to rotate at least 360 degrees related to cover 50.

In embodiments, retaining ring 70 may include a generally cylindrical shape and may include one or more recesses 72. A recess 72 be configured as a radial recess (e.g., may reduce the radial length of retaining ring 70 in at least some areas) and may extend partially or entirely around the circumference of retaining ring 70. In embodiments, retaining ring 70 may include a plurality of recesses 72 spaced around the circumference of retaining ring 70. Recesses 72 may correspond to (e.g., include an axial width at least as great as or greater than) connecting portion 66 of a pin (e.g., pin 60F and/or 60G) and/or may be configured to at least partially receive a pin 60. Pins 60 may be configured to be connected to and/or engaged with retaining ring (e.g., disposed at least partially in recess 72 and/or engaged in a threaded engagement). In embodiments, recesses 72 may be configured as an aperture extending all of the way through retaining ring 70 and/or pins 60 may be configured to extend all of the way through recesses 72. In embodiments, joint 20 may include a first tube adapter (e.g., tube adapter 40A) that may be rotationally fixed relative to cover 50 and/or may include a second tube adapter (e.g., tube adapter 40B) that may be configured to for at least some rotational and/or torsional movement relative to cover 50. In embodiments, tube adapters 40A, 40B may be configured for at least some rotational/torsional movement relative to cover 50.

Retaining ring 70 may be configured to permit the position of the tube adapters 40A, 40B to be variable. For example, pins 60F and 60G may extend through cover 50 into recesses 72A, 72B and pins 60F and 60G may be configured to be at least partially received within recesses 72A, 72B. A retaining ring 70 may be configured to move and/or slide relative to a tube adapter (e.g., tube adapter 40B) and/or may permit the tube adapter to rotate. In embodiments, retaining ring 70 may be fixed to a tube adapter (e.g., first tube adapter 40A) and pins 60 may be permitted to slide in a circumferential direction in recess 72.

In embodiments, retaining ring 70 may be configured to restrict axial movement of a tube adapter in a direction (e.g., direction 78B) and/or may be configured not to restrict axial movement of a tube adapter in a second direction (e.g., direction 78A). Tube adapter second portions 44A, 44B may include one or more retaining portions (e.g., retaining portions 44C, 44D) that may facilitate retaining ring 70 restricting axial movement of a tube adapter. For example, and without limitation, retaining portion 44C may be configured to at least partially restrict axial movement of tube adapter 40B in direction 78B and/or retaining portion 44D may be configured to at least partially restrict axial movement of tube adapter 40B in direction 78A. Retaining portions 44C, 44D may be integrally formed with a tube adapter and/or may be connected to a tube adapter in one or more of a variety of ways, including, for example, welding. In embodiments, retaining portion 44D may be connected to a tube adapter (e.g., first tube adapter 40A) after the tube adapter has been disposed/assembled relative to cover 50 and/or retaining ring 70.

In embodiments, joint 20 may be configured to selectively rotationally fix a tube adapter (e.g., tube adapter 40A) relative to cover 50. For example, joint 20 may include a lock 80. Lock 80 may include a generally pin-like shape and may be connected to a tube adapter and/or retaining ring 70. Lock 80 may be configured to be moved to engage and/or disengage the tube adapter and/or retaining ring 70. In embodiments, one or more of pins 60 may be configured as a locking mechanism (e.g., may include a greater length, may include threaded portions, and/or may be configured to selectively move in a radial direction), for example as generally illustrated in connection with element 80.

Figure 8:
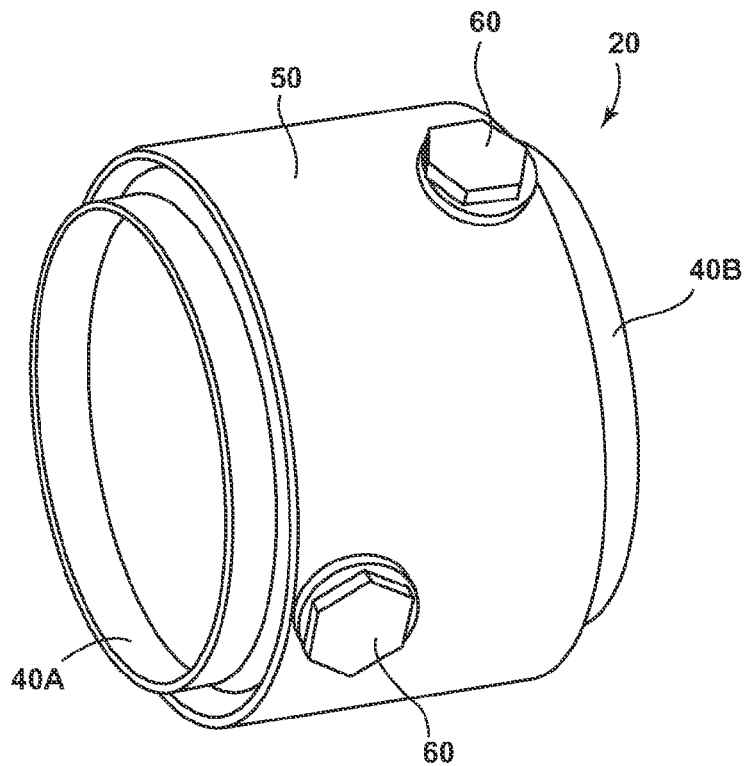
FIG. 8 is a perspective view generally illustrating portions of a joint in accordance with teachings of an embodiment of the present disclosure.

As generally illustrated in FIG. 8, an outer appearance of joint 20 may be substantially similar regardless of whether joint includes a retaining ring 70.

Figure 9A:
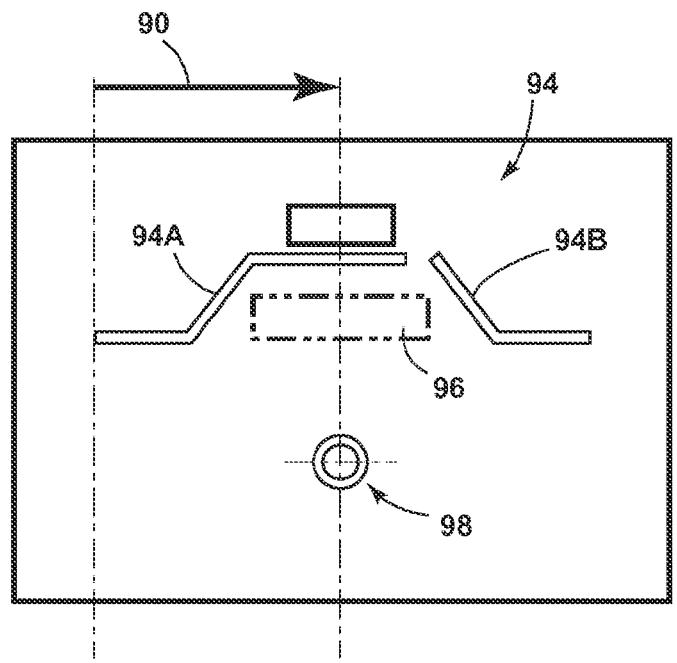
FIG. 9A generally illustrates a hinge axis configuration of a joint in accordance with teachings of an embodiment of the present disclosure.
Figure 9B:
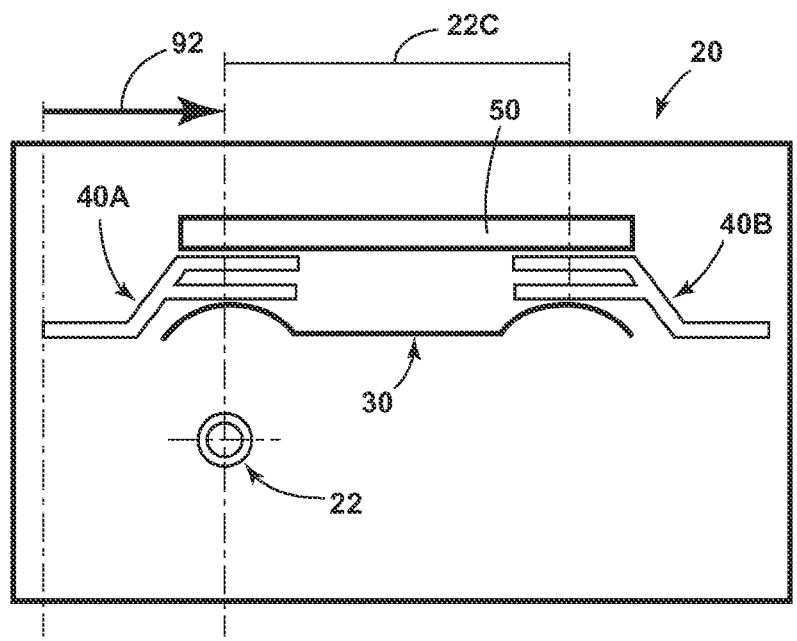
FIG. 9B generally illustrates a hinge axis configuration of a joint in accordance with teachings of an embodiment of the present disclosure.

As generally illustrated in FIGS. 9A and 9B, axial separation of hinge axes 22 of joint 20 may reduce the moment arm length 92 to the hinge axes of joint 20. For example, as shown in FIG. 9A, conventional joints with coplanar hinge axes 98 (e.g., without axial separation 22C) include a relatively long moment arm 90. In contrast, as generally illustrated in FIG. 9B, embodiments of joint 20 according to the present disclosure may include a relatively short moment arm 92. A reduced moment arm length may reduce cantilever loads on equipment attached to first and/or second duct sections 18A, 18B. The equipment may include engine ports, precoolers, valves, and/or any other desired equipment. Axial separation 22C of hinge axes 22 may also prevent the need for the "ear" configuration 94 generally illustrated in FIG. 9A. In an "ear" configuration 94, a joint may include left and right sections 94A, 94B that each include axially, radially, and/or circumferentially overlapping "ears" that extend radially outward and are fastened to a common gimbal ring 96.

In embodiments, joint 20 may comprise one or more materials. In embodiments, joint 20 may be independent of and/or not include any weldments and/or may be assembled without welding. For example, joint 20 may be assembled without welding tube seal 30 with tube adapters 40A, 40B. In embodiments, the only weldments or welding used in joint 20 may be to secure pins 60 to cover 50.

The foregoing descriptions of specific embodiments of the present disclosure have been presented for purposes of illustration and description. They are not intended to be exhaustive or to limit the invention to the precise forms disclosed, and various modifications and variations are possible in light of the above teaching. It should be understood that the present disclosure is not limited to the examples and/or embodiments described herein. For example, references to a single element are not so limited and may include one or more of such element. It is intended that the scope of the invention be defined by the claims appended hereto and their equivalents.

What is claimed is:

1. A fluid conduit joint, comprising:
a tube seal including a first bubble portion and a second bubble portion;
a first tube adapter;
a second tube adapter;
a cover;
a first bearing sleeve disposed between the first tube adapter and the first bubble portion;
a first hinge connecting the first tube adapter to the cover; and
a second hinge connecting the second tube adapter to the cover;
wherein the first hinge and the second hinge are axially spaced from each other.

2. The joint of claim 1, wherein the first tube adapter includes a first inner portion configured to contact the first bubble portion, and the first tube adapter includes a first outer portion configured to connect with the cover.

3. The joint of claim 2, wherein the second tube adapter includes a second inner portion configured to contact the second bubble portion, and the second tube adapter includes a second outer portion configured to connect with the cover.

4. The joint of claim 1, wherein the first hinge comprises a first pin and a second pin; the first pin and the second pin extend through the cover, through the first tube adapter, and into a first retainer; the second hinge comprises a third pin and a fourth pin; and the third pin and the fourth pin extend through the cover, through the second tube adapter, and into a second retainer.

5. The fluid conduit joint of claim 4, wherein the first pin and the second pin define a first hinge axis; the third pin and the fourth pin define a second hinge axis; and the first hinge axis is parallel with the second hinge axis.

6. An aircraft air duct double hinge joint, comprising:
a tube seal including a first bubble portion and a second bubble portion;
a cover;
a first adapter;
a second adapter; and
a first hinge axially spaced from a second hinge, the first hinge connecting the first adapter to the cover, the second hinge connecting the second adapter to the cover;
wherein the first hinge comprises a first pin and a second pin; the first pin and the second pin extend through the cover, through the first adapter, and into a first retainer; the second hinge comprises a third pin and a fourth pin; and the third pin and the fourth pin extend through the cover, through the second adapter, and into a second retainer.

7. The joint of claim 6, comprising a first bearing sleeve disposed between the first adapter and the first bubble portion.

8. The joint of claim 7, comprising a second bearing sleeve disposed between the second adapter and the second bubble portion, wherein the first bearing sleeve and the second bearing sleeve are axially spaced from each other.

9. The double hinge joint of claim 8, wherein the first adapter and the second adapter are axially spaced from each other such that the first adapter and the second adapter do not overlap with each other in a radial direction and do not overlap with each other in a circumferential direction.

10. The double hinge joint of claim 8, wherein the first retainer is disposed between the first adapter and the cover; the first pin and the second pin cooperate to prevent relative axial movement between the cover and the first adapter; and the first pin and the second pin cooperate to permit relative rotational movement between the first adapter and the cover.

11. The double hinge joint of claim 10, wherein the first pin includes a head portion, a neck portion, and a connecting portion; a diameter of the neck portion is less than a diameter of the head portion and greater than a diameter of the connecting portion; and the neck portion is threaded for engagement with the cover.

12. The double hinge joint of claim 8, wherein a first bearing sleeve is disposed between the first adapter and the first bubble portion, and a second bearing sleeve is disposed between the second adapter and the second bubble portion.

13. A fluid conduit joint, comprising:
a tube seal including a first bubble portion and a second bubble portion;
a first tube adapter;
a second tube adapter;
a cover;
a first hinge connecting the first tube adapter to the cover; and
a second hinge connecting the second tube adapter to the cover;
wherein the first hinge and the second hinge are axially spaced from each other; the tube seal includes a neck portion; the first bubble portion includes a maximum diameter greater than a maximum diameter of the neck portion; and the first bubble portion includes a minimum diameter less than a minimum diameter of the neck portion.

14. A fluid conduit joint, comprising:
a cover;
a tube seal including a longitudinal axis, a first bubble portion and a second bubble portion;
a first adapter disposed at least partially around the tube seal;
a second adapter disposed at least partially around the tube seal;
a first hinge; and
a second hinge;
wherein the first hinge and the second hinge are axially spaced from each other; a retaining ring is disposed between the first adapter and the cover; wherein a first pin extends through the cover into the retaining ring; a second pin extends through the cover into the retaining ring; the first pin and the second pin cooperate to prevent relative axial movement between the cover and the first adapter; and the first pin and the second pin cooperate to permit relative rotational movement between the first adapter and the cover.

15. The fluid conduit joint of claim 14, comprising:
a second retaining ring disposed between the cover and the second adapter; and
a second pin extending through an aperture of the cover, and at least partially into a recess of the second retaining ring;
wherein the second pin and the second retaining ring are configured to cooperate to prevent substantial relative axial movement between the cover and the second adapter, and to allow relative rotational movement between the cover the second adapter.

16. The fluid conduit joint of claim 14, comprising a first bearing sleeve disposed between the first adapter and the tube seal.

17. The fluid conduit joint of claim 16, comprising a second bearing sleeve disposed between the second adapter and the tube seal.

18. The fluid conduit joint of claim 14, where the first adapter and the second adapter are axially spaced from each other such that they do not overlap with each other in a radial direction and do not overlap with each other in a circumferential direction.

19. The fluid conduit joint of claim 14, wherein the first adapter and the second adapter comprise titanium, and the tube seal comprises an iron-based metal.

20. The fluid conduit joint of claim 19, wherein the cover comprises aluminum.

\* \* \* \* \*